United States Patent
Higuchi et al.

(10) Patent No.: US 9,376,520 B2
(45) Date of Patent: Jun. 28, 2016

(54) POLYTETRAFLUOROETHYLENE AQUEOUS EMULSION AND PROCESS FOR ITS PRODUCTION, POLYTETRAFLUOROETHYLENE AQUEOUS DISPERSION OBTAINABLE BY USING SUCH AN AQUEOUS EMULSION, POLYTETRAFLUOROETHYLENE FINE POWDER, AND STRETCHED POROUS MATERIAL

(75) Inventors: Shinya Higuchi, Tokyo (JP); Yasuhiko Matsuoka, Tokyo (JP); Shigeki Kobayashi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/447,803

(22) Filed: Apr. 16, 2012

(65) Prior Publication Data

US 2012/0202906 A1  Aug. 9, 2012

Related U.S. Application Data

(63) Continuation of application No. PCT/JP2010/069863, filed on Nov. 8, 2010.

(30) Foreign Application Priority Data

Nov. 9, 2009  (JP) ................ 2009-255949

(51) Int. Cl.
  *C08F 214/26*  (2006.01)
  *C08F 14/26*  (2006.01)
  *C08J 3/03*  (2006.01)

(52) U.S. Cl.
  CPC ............ *C08F 214/26* (2013.01); *C08F 14/26* (2013.01); *C08J 3/03* (2013.01); *C08J 2327/18* (2013.01)

(58) Field of Classification Search
  CPC ...... C08F 14/26; C08F 214/26; C08J 2327/18
  USPC .................................. 524/320, 546
  See application file for complete search history.

(56) References Cited

U.S. PATENT DOCUMENTS

| RE31,907 | E * | 6/1985 | Poirier .................... 525/276 |
|---|---|---|---|
| 4,636,549 | A * | 1/1987 | Gangal et al. ............ 524/546 |
| 4,792,594 | A * | 12/1988 | Gangal et al. ............ 526/253 |
| 5,709,944 | A * | 1/1998 | Kokumai et al. ......... 428/402 |
| 6,054,083 | A * | 4/2000 | Asano et al. ............. 264/117 |
| 6,518,381 | B2 * | 2/2003 | Kobayashi et al. ....... 526/255 |
| 7,141,620 | B2 | 11/2006 | Hoshikawa et al. |
| 7,238,735 | B2 * | 7/2007 | Hoshikawa et al. ...... 523/310 |
| 7,514,483 | B2 * | 4/2009 | Hoshikawa et al. ...... 523/310 |
| 7,514,484 | B2 * | 4/2009 | Hoshikawa et al. ...... 523/310 |
| 7,705,074 | B2 | 4/2010 | Brothers et al. |
| 7,709,566 | B2 | 5/2010 | Hoshikawa et al. |
| 7,776,946 | B2 * | 8/2010 | Hintzer et al. ............ 524/319 |
| 7,851,573 | B2 | 12/2010 | Higuchi et al. |
| 7,973,127 | B2 * | 7/2011 | Higuchi et al. ........... 528/490 |
| 8,263,719 | B2 * | 9/2012 | Sabol et al. .............. 526/250 |
| 2005/0038177 | A1 | 2/2005 | Hoshikawa et al. |
| 2007/0015865 | A1 | 1/2007 | Hintzer et al. |
| 2007/0043164 | A1 * | 2/2007 | Hoshikawa et al. ...... 524/544 |
| 2007/0060699 | A1 * | 3/2007 | Tsuda et al. .............. 524/544 |
| 2008/0200571 | A1 * | 8/2008 | Higuchi et al. ........... 521/65 |
| 2008/0200627 | A1 * | 8/2008 | Funaki et al. ............ 526/214 |
| 2008/0207859 | A1 | 8/2008 | Matsuoka et al. |
| 2008/0214714 | A1 * | 9/2008 | Hoshikawa et al. ...... 524/319 |
| 2008/0287599 | A1 * | 11/2008 | Dadalas et al. ........... 524/546 |
| 2010/0029878 | A1 | 2/2010 | Matsuoka et al. |
| 2011/0040054 | A1 * | 2/2011 | Higuchi et al. ........... 526/255 |
| 2012/0157570 | A1 * | 6/2012 | Hoshikawa et al. ...... 523/220 |

FOREIGN PATENT DOCUMENTS

| CN | 101218268 A | 7/2008 |
|---|---|---|
| CN | 101296950 A | 10/2008 |
| EP | 1 469 104 A1 | 10/2004 |
| EP | 1 849 829 A1 | 10/2007 |
| EP | 1 939 222 A1 | 7/2008 |

(Continued)

OTHER PUBLICATIONS

Combined Office Action and Search Report issued Nov. 6, 2013 in Chinese Patent Application No. 201080051607.2 (with English Translation of Category of Cited Documents).

(Continued)

*Primary Examiner* — Melissa Rioja
(74) *Attorney, Agent, or Firm* — Oblon, McClelland, Maier & Neustadt, L.L.P.

(57) ABSTRACT

To produce a PTFE aqueous emulsion, whereby the environmental load is little, the stability of the aqueous emulsion is high, and a molded product having high heat resistance can be obtained. A process for producing a PTFE aqueous emulsion, which comprises emulsion-polymerizing tetrafluoroethylene (TFE) by means of at least one fluorinated emulsifier selected from the group consisting of a $C_{4-8}$ fluorinated carboxylic acid having from 1 to 4 etheric oxygen atoms in its main chain, and its salts, to obtain an aqueous emulsion containing polytetrafluoroethylene (PTFE) microparticles having an average primary particle size of from 0.1 to 0.3 µm, wherein at the beginning of the emulsion polymerization of TFE, a (polyfluoroalkyl)ethylene (a) represented by "$CH_2=CH-Rf^1$", and/or a comonomer (b) having a monomer reactivity ratio $r_{TFE}$ of from 0.1 to 8 in copolymerization with tetrafluoroethylene, is incorporated to the emulsion polymerization system, so as to be from 0.001 to 0.01 mass % relative to the final amount of polytetrafluoroethylene produced.

9 Claims, 1 Drawing Sheet

(56) References Cited

FOREIGN PATENT DOCUMENTS

| JP | 11-240917 | 9/1999 |
| JP | 2003-268034 A | 9/2003 |
| JP | 3613024 B2 | 1/2005 |
| JP | 2007-23088 A | 2/2007 |
| JP | 4951970 B2 | 6/2012 |
| WO | WO 2005/061567 A | 7/2005 |
| WO | WO 2007/007422 A1 | 1/2007 |
| WO | WO 2007/046345 | 4/2007 |
| WO | WO 2009/014136 | 1/2009 |

OTHER PUBLICATIONS

Communication issued Oct. 29, 2014 in European Patent Application No. 10828382.1.

Hadi Bakhshi, et al.,"Emulsion Copolymerization of Butyl Acrylate and Glycidyl Methacrylate: Determination of Monomer Reactivity Ratios", Iranian Polymer Journal, vol. 19 No. 10, 2010, pp. 781-789 http://journal.ippi.ac.ir.

Hale Berber Yamak, et al., "Emulsion Polymerization: Effects of Polymerization Variables on the Properties of Vinyl Acetate Based Emulsion Polymers", Polymer Science, Chapter 2, INTECH, 2013, 38 pages.

Li Xinxin, et al., "Effect of temperature on copolymerization parameters of hydroxyethyl acrylate and methyl methacrylate", Chinese Journal of Polymer Science, vol. 16, No. 1, 1998, 7pages.

Offer of Information issued Sep. 13, 2013 in Japanese Patent Application No. 2011-539417 partially translated.

International Search Report issued Feb. 1, 2011 in PCT/JP2010/069863 filed Nov. 8, 2010.

* cited by examiner

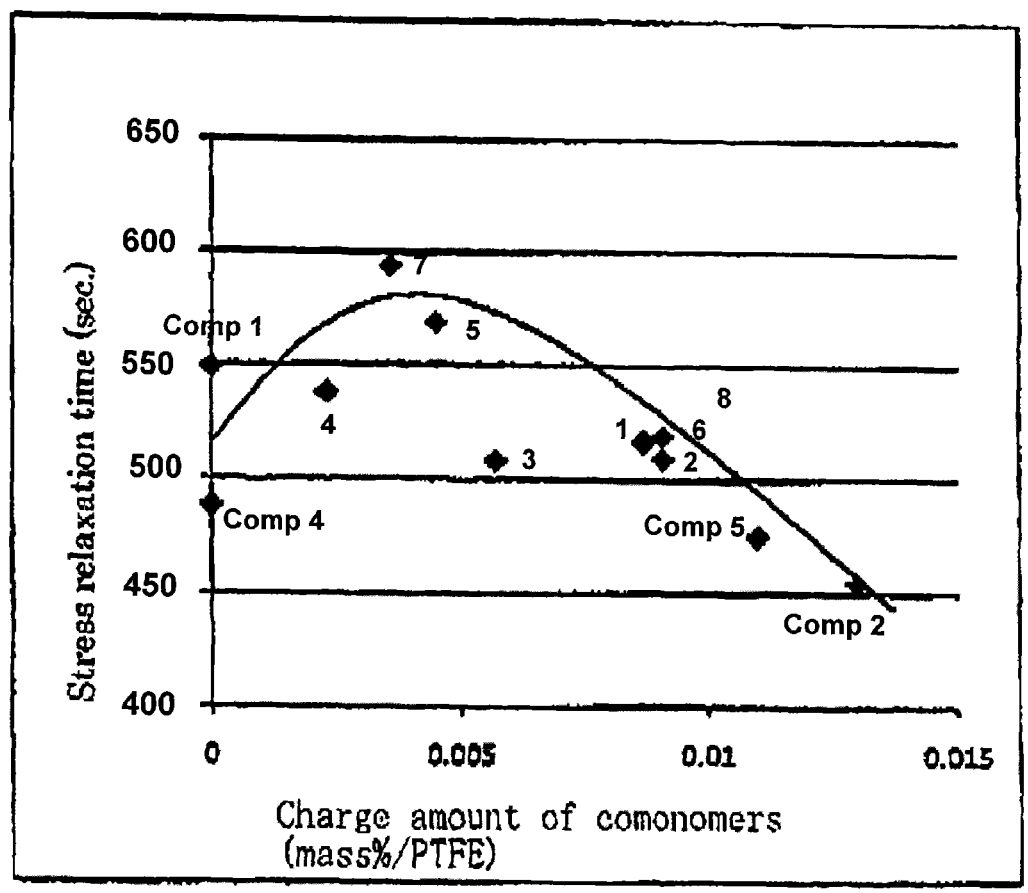

POLYTETRAFLUOROETHYLENE AQUEOUS EMULSION AND PROCESS FOR ITS PRODUCTION, POLYTETRAFLUOROETHYLENE AQUEOUS DISPERSION OBTAINABLE BY USING SUCH AN AQUEOUS EMULSION, POLYTETRAFLUOROETHYLENE FINE POWDER, AND STRETCHED POROUS MATERIAL

TECHNICAL FIELD

The present invention relates to a process for producing a polytetrafluoroethylene aqueous emulsion whereby the environmental load is little, and it is possible to obtain a polytetrafluoroethylene aqueous emulsion containing polytetrafluoroethylene microparticles having a high molecular weight, a polytetrafluoroethylene aqueous emulsion obtainable by such a process, a polytetrafluoroethylene aqueous dispersion obtainable by using such an aqueous emulsion, a polytetrafluoroethylene fine powder, and a stretched porous material.

BACKGROUND ART

An aqueous emulsion of polytetrafluoroethylene (hereinafter referred to as "PTFE") is obtainable by emulsion-polymerizing tetrafluoroethylene (hereinafter referred to as "TFE"). Such an aqueous emulsion of PTFE (hereinafter referred to as a "PTFE aqueous emulsion") is subjected to stabilization treatment by adding e.g. a nonionic surfactant, as the case requires, and concentrated to obtain a PTFE aqueous dispersion. And, after adding various compounding ingredients, such a dispersion is used for application to various coatings or application for impregnation. Further, a fine powder of PTFE (hereinafter referred to as a "PTFE fine powder") is obtainable by exerting a shearing force to a PTFE aqueous emulsion to coagulate PTFE microparticles, followed by drying. The PTFE fine powder is molded by a method such as paste extrusion molding and then used for various applications.

In the emulsion polymerization of TFE, a fluorinated emulsifier is usually employed. As such a fluorinated emulsifier, ammonium perfluorooctanoate (structural formula: $CF_3(CF_2)_6COONH_4$, hereinafter referred to as "APFO") having 8 carbon atoms wherein the main chain is composed solely of carbon atoms, is commonly used. However, APFO is not present in the natural world and is a hardly decomposable substance, and further, it has been pointed out that its biological accumulation property is high, and it has been proposed to suppress its discharge from the environmental aspect.

Whereas, many techniques have been proposed to use a fluorinated carboxylic acid containing etheric oxygen atoms in its molecule, or its salt, as a fluorinated emulsifier having a low biological accumulation property (e.g. Patent Documents 1 to 3).

Patent Document 1 discloses a fluorinated emulsifier of the formula $CF_3—(OCF_2)_m—O—CF_2—X$ (wherein X is a carboxylic acid or its salt, and m is from 1 to 6) and/or $CF_3—O—(CF_2)_3—(OCF(CF_3)—CF_2)_z—O-L-Y$ (wherein Y is a carboxylic acid or its salt, z is from 0 to 3, and L is $—CF(CF_3)—$, $—CF_2—$ or $—CF_2CF_2—$). Further, in Example 1 thereof, $CF_3—O—C_3F_6—OCF(CF_3)COONH_4$ is disclosed, and relatively high molecular weight PTFE having a standard specific gravity (hereinafter referred to as "SSG") of 2.154 is produced. However, in a Comparative Example using APFO, SSG is 2.148, whereby it is suggested that with the above fluorinated emulsifier, the molecular weight can hardly be increased. Further, the solid content concentration is less than 10%, whereby the ability as a surfactant is presumed to be low as compared with APFO.

Patent Document 2 discloses a process for producing PTFE by using at least 800 g/mol of a dispersant wherein a fluoropolyether acid or its salt, and a fluorinated emulsifier having a main chain length of at most 6 atoms are used in combination. In Examples 5 to 9 therein, a fluoropolyether having a molecular weight of about 2,100 and $C_3F_7—O—CF(CF_3)—COONH_4$ are used in combination. Although a few percent of PTFE is coagulated and deposited during the polymerization, it is possible to obtain a PTFE aqueous emulsion having a solid content concentration of from 28.0 to 29.9%, and a sufficient stability of the PTFE aqueous emulsion can be secured. However, SSG of PTFE is 2.177, whereby it is presumed difficult to increase the molecular weight of PTFE. Further, 20% of the dispersant used, is a fluoropolyether having a molecular weight of about 2,100. Such a fluoropolyether has a molecular weight higher than APFO, whereby there is a concern about its accumulation in vivo or its discharge in vitro as well as its residual amount in a PTFE product or its influence to a molded product.

Patent Document 3 discloses a method for emulsion-polymerizing TFE by means of such a fluorinated emulsifier that among compounds represented by $Rf^1—O—(Rf^2O)_n—Rf^3—COOM$ (wherein $Rf^1$ is a $C_{1-3}$ fluoroalkyl group, each of $Rf^2$ and $Rf^3$ which may be the same or different, is a $C_{1-3}$ fluoroalkylene group, M is anyone of H, K, Na or $NH_4$, and n is an integer of 0 or more), at least two compounds different in the value of n are present so that the average value is from 2 to 4. If the fluoroalkyl group in the fluorinated emulsifier becomes a long chain, the residual amount in PTFE increases, although the surface activating performance may be improved, and if it becomes a short chain, the surface activating performance tends to be inadequate, although the residual amount in PTFE may be small. It is disclosed that by combining fluorinated emulsifiers having long and short chains, the fluorinated emulsifiers can easily be removed from PTFE, and further, the surface activating performance can sufficiently be obtainable. In Examples, the solid content concentration is 33.0%, and a sufficient stability of a PTFE aqueous emulsion is secured. On the other hand, SSG is 2.189, whereby it is presumed difficult to attain a high molecular weight of PTFE.

The residual amount in PTFE is influenced by the chain length of the long chain component and the mixing ratio to the short chain component. In Examples in Patent Document 3, $CF_3O(CF_2O)_4CF_2COONH_4$ contained in an amount of 10% has a length of the main chain excluding the carboxy group being 11 atoms as the sum of carbon and oxygen atoms, and thus, is likely to have a high residual nature as compared with APFO having a length of the main chain being 7 atoms.

Thus, with the fluorinated emulsifier presumed to have a lower residual nature in PTFE than APFO and low biological accumulation, the surface activating performance is low, the stability of the PTFE aqueous emulsion is inadequate, and various problems may occur, and it is difficult to obtain PTFE having a high molecular weight. By using a high molecular weight fluoropolyether or a fluorinated emulsifier having a longer chain in combination, the surface activating performance will be improved, but there is a concern about the problem of the residual nature in PTFE or the influence to a molded product.

Patent Document 4 discloses that by copolymerizing a (perfluoroalkyl)ethylene to TFE at the initial stage of emulsion polymerization of TFE so that the content of polymerized units derived from the (perfluoroalkyl)ethylene will be from 0.005 to 0.05 mol %, it is possible to obtain a PTFE fine powder excellent in extrusion processability, whereby uniform stretch processing is possible, and a high strength porous material can be obtained. It is disclosed that as a fluorinated emulsifier, a $C_{7-9}$ ammonium perfluoroalkane carboxylate is preferably employed, but in each of Examples, APFO is used. Thus, since APFO is used as a fluorinated emulsifier, there has been a problem that the environmental load is large. Further, Patent Document 4 discloses nothing about the heat resistance which is an important element in the molding of a stretched porous material of PTFE. Further, there is no disclosure relating to the stability of the PTFE aqueous emulsion. Therefore, it has been not known whether or not it is possible to obtain a PTFE aqueous emulsion whereby the stability of the PTFE aqueous emulsion is sufficiently high to such an extent not to impair the processability or moldability, and it is possible to prepare a molded product excellent in heat resistance, in a case where a fluorinated emulsifier having a lower surface activating performance than APFO is employed.

PRIOR ART DOCUMENTS

Patent Documents

Patent Document 1: US Patent Application Publication No. 2007/0015865
Patent Document 2: US Patent Application Publication No. 2008/0269408
Patent Document 3: WO 2009/014136
Patent Document 4: JP-A-11-240917

DISCLOSURE OF INVENTION

Technical Problem

It is an object of the present invention to provide a PTFE aqueous emulsion, whereby the environmental load is little, the stability of the PTFE aqueous emulsion is sufficiently high to such an extent not to impair the subsequent processability, moldability, etc., and a molded product excellent in heat resistance can be produced, and a process for its production, a PTFE aqueous dispersion, a PTFE fine powder, and a stretched porous material.

Solution to Problem

The present invention provides the following.
[1] A process for producing a polytetrafluoroethylene aqueous emulsion, which comprises emulsion-polymerizing tetrafluoroethylene by means of at least one fluorinated emulsifier selected from the group consisting of a $C_{4-8}$ fluorinated carboxylic acid having from 1 to 4 etheric oxygen atoms in its main chain, and its salts, to obtain an aqueous emulsion containing polytetrafluoroethylene microparticles having an average primary particle size of from 0.1 to 0.3 μm, wherein at the beginning of the emulsion polymerization of tetrafluoroethylene, a (polyfluoroalkyl)ethylene (a) represented by the following formula (1), and/or a comonomer (b) having a monomer reactivity ratio $r_{TFE}$ of from 0.1 to 8 in copolymerization with tetrafluoroethylene, is incorporated to the emulsion polymerization system, so as to be from 0.001 to 0.01 mass % relative to the final amount of polytetrafluoroethylene produced, $$CH_2=CH-Rf^1 \qquad (1)$$

(in the formula (1), $Rf^1$ is a $C_{1-10}$ polyfluoroalkyl group).
[2] The process for producing a polytetrafluoroethylene aqueous emulsion according to [1], wherein the average primary particle size of the polytetrafluoroethylene microparticles is from 0.2 to 0.3 μm.
[3] The process for producing a polytetrafluoroethylene aqueous emulsion according to [1] or [2], wherein the (polyfluoroalkyl)ethylene (a) is at least one member selected from the group consisting of $CH_2=CH-(CF_2)_2F$, $CH_2=CH-(CF_2)_4F$ and $CH_2=CH-(CF_2)_6F$.
[4] The process for producing a polytetrafluoroethylene aqueous emulsion according to [1] or [2], wherein the comonomer (b) is at least one member selected from the group consisting of the following formula (2), the following formula (3), perfluoro(2-methylene-4-methyl-1,3-dioxolane), perfluoro(2,2-dimethyl-1,3-dioxole) and perfluoro(5-methoxy-1,3-dioxole), $$CF_2=CF-O-(CF_2)_nCF=CF_2 \qquad (2)$$

(in the formula (2), n is an integer of 1 or 2), $$CF_2=CF-O-Rf^2 \qquad (3)$$

(in the formula (3), $Rf^2$ is a $C_{1-2}$ perfluoroalkyl group).
[5] A polytetrafluoroethylene aqueous emulsion obtainable by the process as defined in any one of [1] to [4].
[6] A polytetrafluoroethylene aqueous dispersion obtainable by adding a nonionic surfactant to the polytetrafluoroethylene aqueous emulsion as defined in [5] for stabilization, followed by concentration, wherein the content of polytetrafluoroethylene microparticles is from 50 to 70 mass %.
[7] A polytetrafluoroethylene fine powder obtainable by coagulating the polytetrafluoroethylene aqueous emulsion as defined in [5], which maintains a stress relaxation time of at least 500 seconds.
[8] The polytetrafluoroethylene fine powder according to [7], which has a standard specific gravity of from 2.135 to 2.155.
[9] A stretched porous material obtainable by paste extrusion of the polytetrafluoroethylene fine powder as defined in [7] or [8], followed by stretching.

Advantageous Effects of Invention

According to the present invention, at the time of emulsion-polymerizing TFE by means of at least one fluorinated emulsifier selected from the group consisting of a $C_{4-8}$ fluorinated carboxylic acid having from 1 to 4 etheric oxygen atoms in its main chain, and its salts, by incorporating, at the beginning of the emulsion polymerization of TFE, a (polyfluoroalkyl)ethylene (a) and/or a comonomer (b) having a monomer reactivity ratio $r_{TFE}$ of from 0.1 to 8 in copolymerization with TFE, to the emulsion polymerization system, so as to be from 0.001 to 0.01 mass % relative to the final amount of PTFE, it is possible to produce a PTFE aqueous emulsion, whereby the stability of the PTFE aqueous emulsion is sufficiently high to such an extent not to impair the subsequent processability, moldability, etc., and it is possible to obtain a molded product having a high heat resistance. Further, the fluorinated emulsifier to be used for the production of such a PTFE aqueous emulsion has a low residual nature in PTFE, a low accumulation in vivo and little environmental load.

DESCRIPTION OF EMBODIMENTS

The process for producing a PTFE aqueous emulsion of the present invention comprises emulsion-polymerizing TFE by means of at least one fluorinated emulsifier selected from the group consisting of $C_{4-8}$ fluorinated carboxylic acid having from 1 to 4 etheric oxygen atoms in its main chain, and its salts, wherein at the beginning of the emulsion polymerization of TFE, a (polyfluoroalkyl)ethylene (a) represented by the following formula (1), and/or a comonomer (b) having a monomer reactivity ratio $r_{TFE}$ of from 0.1 to 8 in copolymerization with TFE (hereinafter the (polyfluoroalkyl)ethylene (a) and the comonomer (b) may be referred to generally as "the highly reactive comonomer") is incorporated to the emulsion polymerization system, so as to be from 0.001 to 0.01 mass % relative to the final amount of PTFE produced.

(in the formula (1), $Rf^1$ is a $C_{1-10}$ polyfluoroalkyl group).

Firstly, the highly reactive comonomer to be used in the process for producing a PTFE aqueous emulsion of the present invention will be described.

The (polyfluoroalkyl)ethylene (a) is preferably such that the number of carbon atoms in $Rf^1$ in the formula (1) is from 2 to 10, more preferably from 3 to 8. Preferred examples include $CH_2=CH-(CF_2)_2F$, $CH_2=CH-(CF_2)_4F$ and $CH_2=CH-(CF_2)_6F$.

The comonomer (b) is one having a monomer reactivity ratio $r_{TFE}$ of from 0.1 to 8 in copolymerization with TFE, and the reactivity ratio $r_{TFE}$ is more preferably from 0.1 to 7, particularly preferably from 0.2 to 6.

Here, the monomer reactivity ratio $r_{TFE}$ in copolymerization with TFE (hereinafter referred to as the "monomer reactivity ratio $r_{TFE}$") is a value obtained by dividing a rate constant in the reaction of propagating radicals with TFE by a rate constant in the reaction of the propagating radicals with the comonomer when the propagating radicals are repeating unit terminals derived from TFE. The lower the value, the higher the reactivity of the comonomer with TFE. The monomer reactivity ratio $r_{TFE}$ can be calculated by the Fineman-Ross formula by obtaining the composition of the polymer formed immediately after initiation of the copolymerization of TFE with the comonomer.

As the comonomer having a monomer reactivity ratio $r_{TFE}$ of from 0.1 to 8, a (polyfluoroalkyl)ethylene represented by the above formula (1) may be mentioned. Among them, $CH_2=CH-CF_3$ and $CH_2=CH-(CF_2)_3F$ are reported in literatures. Amer. Chem. Soc., Div. Polymer Chem., Preprints 7(2), 1116 (1966) discloses that the monomer reactivity ratio $r_{TFE}$ in copolymerization of $CH_2=CH-CF_3$ with TFE is from 0.12 to 0.15. Further, J. Polymer Sci., A-1 8 2441 (1970) discloses that the monomer reactivity ratio $r_{TFE}$ in copolymerization of $CH_2=CH(CF_2)_3F$ with TFE is 0.21.

Further, as another comonomer having a monomer reactivity ratio $r_{TFE}$ of from 0.1 to 8, perfluoro(2-methylene-4-methyl-1,3-dioxolane) may be mentioned. The monomer reactivity ratio $r_{TFE}$ in copolymerization of this comonomer with TFE was calculated by the Fineman-Ross formula by obtaining the composition in the polymer formed immediately after initiation of the copolymerization with TFE in various charge compositions and found to be 0.4.

Further, for example, comonomers represented by the following formulae (2) to (4) may be mentioned.

(in the formula (2), $Rf^2$ is a $C_{1-2}$ perfluoroalkyl group).

(in the formula (3), n is an integer of 1 or 2),

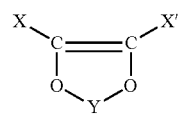

(in the formula (4), each of X and X' is F, Cl or a methoxy group, and Y is the following (Y1) or (Y2)).

$$-CF=CF- \quad (Y1)$$

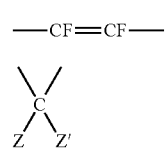

(in the formula (Y2), each of Z and Z' is F or a $C_{1-3}$ fluorinated alkyl group).

With respect to the comonomer represented by the above formula (2), Zh. Prikl. Khim. 57, 1126 (1984) discloses that the monomer reactivity ratio $r_{TFE}$ of $CF_2=CF-O-CF_3$ where the number of carbon atoms in $Rf^2$ is 1, is 1.73 and the monomer reactivity ratio $r_{TFE}$ of $CF_2=CF-O-C_3F_7$ where the number of carbon atoms in $Rf^2$ is 3, is 8.72. This $CF_2=CF-O-C_3F_7$ (the number of carbon atoms in $Rf^2$ is 3) having a monomer reactivity ratio $r_{TFE}$ exceeding 8, has a low reactivity with TFE, and as will be shown in Comparative Example 3 given hereinafter, even if the reaction is initiated with a very small amount at the initial stage of the polymerization, the polymerization rate substantially decreases, the molecular weight of PTFE cannot be increased, and further, a sufficient yield of PTFE cannot be obtained.

With respect to the comonomer represented by the above formula (3), the monomer reactivity ratio $r_{TFE}$ in copolymerization of $CF_2=CF-O-(CF_2)_2CF=CF_2$ with TFE was calculated by the Fineman-Ross formula by obtaining the composition in the polymer formed immediately after the initiation of the copolymerization with TFE in various charge compositions and found to be 5.7.

The comonomer represented by the above formula (4) may, for example, be perfluoro(5-methoxy-1,3-dioxole), or perfluoro(2,2-dimethyl-1,3-dioxole). The monomer reactivity ratio $r_{TFE}$ in copolymerization of perfluoro(2,2-dimethyl-1,3-dioxole) with TFE was calculated by the Fineman-Ross formula by obtaining the composition in the polymer formed immediately after the initiation of the copolymerization with TFE in various charge compositions and found to be 1.8.

Thus, the present inventors have found that by adding a very small amount of the highly reactive comonomer having a monomer reactivity ratio $r_{TFE}$ within the above range at the initiation of emulsion polymerization of TFE, even if a fluorinated emulsifier having a low surface activating performance is used, it is possible to produce a PTFE aqueous emulsion having PTFE microparticles with a high molecular weight dispersed, whereby the stability of the PTFE aqueous emulsion is sufficiently high to such an extent not to adversely affect processabilities, etc., and it is possible to obtain a molded product having a high heat resistance. The reason is not necessarily clear, but is considered to be as follows.

That is, it is considered that at the initial stage of the emulsion polymerization of TFE, TFE and the highly reactive comonomer are copolymerized, whereby PTFE formed at the initial stage of the polymerization takes a crystalline-destroyed structure, and at the time of forming nuclei of primary particles, it is likely to take a structure close to a sphere. And, it is considered that as the nuclei of primary particles are likely to take a structure close to a sphere, the degree for association of the nuclei to one another tends to be less, and more nuclei of primary particles tend to grow in a state where the particle sizes are uniform, while formation of abnormal particles such as rod-form particles or coarse particles is suppressed. Further, it is considered that as the formation of abnormal particles such as rod-form particles or coarse particles is suppressed, a uniform stretched structure can easily be formed, and a defective structure can be suppressed, whereby the mechanical strength will be improved.

And, in order to increase the molecular weight of PTFE, it is important that the comonomer is consumed in the very initial stage of the emulsion polymerization and becomes nonexistent from the emulsion polymerization system. Especially, in order to obtain an excellent stretched porous material of PTFE, it is important that in the later stage of the polymerization, the amount of radicals newly generated in the emulsion polymerization system is suppressed as far as possible to let living polymerization proceed as far as possible until the polymerization reaction is deactivated and not to hinder the polymerization reaction for improving the molecular weight.

Each of the (polyfluoroalkyl)ethylene (a) represented by the above formula (1) and the comonomer (b) having a monomer reactivity ratio $r_{TFE}$ of from 0.1 to 8, is excellent in the reactivity with TFE, and therefore, by incorporating it in such a very small amount as to be from 0.001 to 0.01 mass % relative to the final amount of PTFE produced in the emulsion polymerization system, it will be almost completely consumed in the initial stage of the emulsion polymerization of TFE and it is possible to prevent deactivation of the polymerization reaction at a later stage of the polymerization. It is considered that as a result, PTFE microparticles having a high molecular weight and having an average primary particle size of from 0.1 to 0.3 µm can be formed.

Here, if the amount of the highly reactive comonomer used is too much, the comonomer is not wholly consumed at the very initial stage of the emulsion polymerization of TFE and will thereafter remain in the emulsion polymerization system, whereby deactivation of the polymerization reaction is caused, and the molecular weight of PTFE will not be increased so much, and further, the primary particle size of PTFE microparticles tends to be small. As a result, the stability of the PTFE aqueous emulsion tends to be remarkably high, and at the time of carrying out concentration of PTFE microparticles by adding a stabilizer to the obtained PTFE aqueous emulsion, the PTFE microparticles tend to be hardly sedimented, whereby the concentration rate decreases, and the productivity decreases. Further, at the time of coagulating PTFE microparticles by exerting a shearing force to the PTFE aqueous emulsion to obtain a PTFE fine powder, the coagulation time tends to be long, and the productivity of the PTFE fine powder tends to decrease.

Further, the molecular weight of PTFE cannot be made high, and in the PTFE microparticles, a region where a crystal structure cannot be formed, will increase, whereby the formed PTFE tends to be inadequate in stretchability and heat resistance. Particularly, the heat resistance represented by the stress relaxation time, will decrease.

Therefore, in the present invention, the highly reactive comonomer is incorporated to the emulsion polymerization system at the beginning of the emulsion polymerization, so as to be from 0.001 to 0.01 mass % relative to the final amount of PTFE produced. It is preferably from 0.002 mass % to 0.01 mass %. If the content of the highly reactive comonomer is lower than 0.001 mass %, the effect to improve the stability of the PTFE aqueous emulsion tends to be low. If the content exceeds 0.01 mass %, the highly reactive comonomer will not be consumed at the very initial stage of the emulsion polymerization and will remain in the emulsion polymerization system, whereby the molecular weight of PTFE will not be increased so much, and the primary particle size of PTFE microparticles tends to be small.

In the present invention, the highly reactive comonomer may be used as diluted with a solvent free from causing a chain transfer. It is thereby possible to precisely control the amount of the comonomer to be added. As such a solvent, a fluorinated solvent having little chain transfer property may, for example, be used. Specifically, $C_5HF_{11}$, $C_5H_2F_{10}$, $C_6HF_{13}$, $C_7HF_{15}$, $C_8HF_{17}$, $CF_3CHFCHFCF_2CF_3$, $CF_3CH_2OCF_2CF_2H$ or the like, may be mentioned. As the degree for dilution, it is preferred to use the solvent in an amount of from 0.1 to 10 parts by mass, per 1 part by mass of the highly reactive comonomer. If the amount of the solvent used is too small, precise control of the amount of the comonomer added tends to be inadequate, and if it is too much, chain transfer is likely to be caused even slightly by the dilution solvent to lower the molecular weight of PTFE thereby to present an adverse effect to the physical properties.

Now, the process for producing a PTFE aqueous emulsion of the present invention will be described.

In the present invention, TFE is emulsion-polymerized in the presence of an aqueous medium, a radical polymerization initiator and a fluorinated emulsifier, etc. As described above, at the beginning of the emulsion polymerization of TFE, the highly reactive comonomer is incorporated to the emulsion polymerization system so as to be from 0.001 to 0.01 mass %, preferably from 0.002 to 0.01 mass %, relative to the final amount of PTFE produced.

The highly reactive monomer may be present in the emulsion polymerization system only at the very initial stage of the polymerization of TFE, and with respect to the timing for the addition of the highly reactive monomer to the emulsion polymerization system, it may be added to the aqueous medium together with other raw materials such as TFE, at the stage of charging various raw materials.

The radical polymerization initiator to be used for the emulsion polymerization of TFE is not particularly limited. A water-soluble radical initiator, a water-soluble redox catalyst or an oil-soluble radical polymerization initiator may, for example, be mentioned. Among them, a water-soluble radical initiator or a water-soluble redox catalyst is preferred.

As the water-soluble radical initiator, a persulfate such as ammonium persulfate or potassium persulfate, or a water-soluble organic peroxide such as disuccinic acid peroxide, bisglutaric acid peroxide or tert-butyl hydroperoxide, is preferred.

As the water-soluble redox catalyst, a combination of an oxidizing agent such as bromic acid or its salt, chloric acid or its salt, persulfuric acid or its salt, permanganic acid or its salt or hydrogen peroxide, and a reducing agent such as sulfurous acid or its salt, hydrogen sulfurous acid or its salt, thiosulfuric acid or its salt, or an organic acid, is preferred.

As the radical polymerization initiator, one type may be used alone, or two or more types may be used in combination. As the radical polymerization initiator, disuccinic acid peroxide is more preferred.

The amount of the radical polymerization initiator to be used is preferably from 0.01 to 0.20 mass %, more preferably from 0.01 to 0.15 mass %, relative to the final amount of PTFE obtained.

The fluorinated emulsifier is commonly used in the emulsion polymerization of TFE, since it is free from preventing the polymerization reaction of TFE by chain transfer in an aqueous medium. In the present invention, one selected from the group consisting of a $C_{4-8}$ fluorinated carboxylic acid having from 1 to 4 etheric oxygen atoms in its main chain, and its salts, is used. Such a fluorinated emulsifier has etheric oxygen and a low molecular weight and is therefore considered to have a low residual nature and a low accumulation property in vivo. Preferred specific examples include $C_3F_7OCF_2CF_2OCF_2COOH$, $C_4F_9OCF_2CF_2OCF_2COOH$, $C_2F_5OCF_2CF_2OCF_2CF_2OCF_2COOH$, $C_3F_7OCF(CF_3)CF_2OCHFCOOH$, $CF_3OCF_2OCF_2OCF_2OCF_2COOH$, $CF_3O(CF_2CF_2O)_2CF_2COOH$, $CF_3CF_2O(CF_2)_5COOH$, $CF_3CFHO(CF_2)_5COOH$, $CF_3OCF(CF_3)CF_2OCF(CF_3)COOH$, $CF_3OC_3F_6OCF(CF_3)COOH$, $CF_3O(CF_2)_3OCHFCF_2COOH$, $C_4F_9OCF(CF_3)COOH$, $C_4F_9OCF_2CF_2COOH$, $CF_3OCF_2CF_2CF_2OCF_2COOH$, $C_2F_5OCF_2CF_2OCF_2COOH$, $CF_3O(CF_2)_3OCHFCOOH$, $CF_3OCF_2OCF_2OCF_2COOH$, $C_4F_9OCF_2COOH$, $C_3F_7OCF_2CF_2OCF_2COOH$, $C_3F_7OCHFCF_2COOH$, $C_3F_7OCF(CF_3)COOH$, $CF_3CFHO(CF_2)_3COOH$, $CF_3OCF_2CF_2OCF_2COOH$, $C_2F_5OCF_2CF_2COOH$, $C_3F_7OCHFCOOH$, $CF_3OCF_2CF_2COOH$, and their salts with Li, Na, K, $NH_4$, etc. More preferred specific examples include $CF_3OC_3F_6OCF(CF_3)COOH$, $C_2F_5OC_2F_4OCF_2COOH$, $C_3F_7OCF_2CF_2COOH$, $CF_3OC_2F_4OCF_2COOH$, $C_4F_9OCF_2COOH$, $C_3F_7OCF(CF_3)COOH$, and their salts with Li, Na, K, $NH_4$, etc. Particularly preferred are ammonium salts ($NH_4$) of the above compounds. An ammonium salts is excellent in the solubility in an aqueous medium and is free from such a possibility that a metal ion component will remain as an impurity in the final product or in the PTFE fine powder.

The amount of the fluorinated emulsifier to be used is preferably from 1,500 to 20,000 ppm, more preferably from 2,000 to 20,000 ppm, most preferably from 2,000 to 15,000 ppm, relative to the final amount of PTFE obtained. If the amount is less than this range, the stability of the emulsion may not be maintained, and if it is larger than this range, the stability of the emulsion corresponding to the amount may not be obtainable, and the shape of the primary particles gradually tends to be a rod-form, and the aqueous emulsion is further likely to be unstable. When the amount is within this range, it is possible to obtain a stabilized aqueous emulsion which satisfies the better economical efficiency.

For the emulsion polymerization of TFE, a stabilizing assistant may further be added in addition to the above raw materials.

As such a stabilizing assistant, a paraffin wax, a fluorinated oil, a fluorinated solvent or a silicone oil may, for example, be preferred. As the stabilizing assistant, one type may be used alone, or two or more types may be used in combination. As the stabilizing assistant, a paraffin wax is more preferred. The paraffin wax may be liquid, semi-solid or solid at room temperature, but is preferably a saturated hydrocarbon having at least 12 carbon atoms. The melting point of the paraffin wax is usually preferably from 40 to 65° C., more preferably from 50 to 65° C.

The amount of the stabilizing assistant is preferably from 0.1 to 12 mass %, more preferably from 0.1 to 8 mass %, based on the mass of the aqueous medium to be used. It is desired that the stabilizing assistant is sufficiently hydrophobic, is completely separated from the PTFE aqueous emulsion after the emulsion polymerization of TFE and will not be a contaminating component.

With respect to the conditions for the emulsion polymerization of TFE, the polymerization temperature is preferably from 10 to 95° C., more preferably from 15 to 90° C. The polymerization pressure is preferably from 0.5 to 4.0 MPa, more preferably from 0.6 to 3.5 MPa. The polymerization time is preferably from 90 to 520 minutes, more preferably from 90 to 450 minutes.

Further, the emulsion polymerization is carried out so that the concentration of the PTFE microparticles in the obtainable PTFE aqueous emulsion will be preferably from 10 to 45 mass %, more preferably from 15 to 45 mass %, particularly preferably from 20 to 40 mass %. If the concentration of PTFE microparticles is less than 10 mass %, it tends to be difficult to coagulate primary particles of PTFE from the PTFE aqueous emulsion, and the production efficiency, etc. of the PTFE fine powder will decrease. On the other hand, if it exceeds 45 mass %, primary particles of PTFE which cannot be coagulated tend to remain, thus leading to a turbidity.

In the PTFE aqueous emulsion obtained by the process of the present invention, the average primary particle size of the PTFE microparticles is from 0.10 to 0.30 μm, preferably from 0.20 to 0.30 μm, more preferably from 0.21 to 0.27 μm, particularly preferably from 0.22 to 0.26 μm. Here, in the present invention, the average primary particle size is a value of the median diameter obtained by measuring the PTFE microparticles in the PTFE aqueous emulsion by means of a laser scattering method particle size distribution analyzer.

If the average primary particle size of the PTFE microparticles is small, the stability of the PTFE aqueous emulsion will be improved. However, if the stabilization proceeds too much, time and labor are required at the time of concentrating the PTFE aqueous emulsion or coagulating the PTFE microparticles by exerting a stirring shearing force to the PTFE aqueous emulsion to obtain a PTFE fine powder, and thus, the production efficiency is impaired in many cases. On the other hand, if the average primary particle size of the PTFE microparticles is large, many problems will occur in the production, such that the stability of the PTFE aqueous emulsion decreases to increase the amount of coagulum during the emulsion polymerization of TFE such being disadvantageous from the viewpoint of the productivity, a large amount of coagulum will be formed in a concentration tank at the time of concentrating the PTFE aqueous emulsion after the emulsion polymerization of TFE, the sedimentation stability of the concentrated solution is impaired to deteriorate the storage stability, and at the time of coagulating the PTFE microparticles by exerting a stirring shearing force to the PTFE aqueous emulsion to obtain a PTFE fine powder, a large amount of coagulum will be formed before transferring from the polymerization tank to the coagulation tank to clog the piping, and the yield is thereby substantially lowered. When the average primary particle size of the PTFE microparticles is within the above range, the stability of the PTFE aqueous emulsion is excellent to such an extent that the subsequent processability, moldability, etc. will not decrease, and it is easy to obtain a molded product excellent in heat resistance, etc.

The average primary particle size of the PTFE microparticles can be adjusted to be within the above range by carrying out the emulsion polymerization by incorporating the highly reactive comonomer to the emulsion polymerization system so as to be from 0.001 to 0.01 mass % relative to the final amount of PTFE produced. Further, in order to increase the average primary particle size of the PTFE microparticles within the above range, the amount of the highly reactive comonomer may be increased within a range prescribed by the present invention. Further, in order to decrease the average primary particle size of the PTFE microparticles within the above range, the amount of the highly reactive comonomer to be added may be reduced within the range prescribed by the present invention.

The PTFE aqueous emulsion of the present invention is preferably such that the stability time measured by the method described in Examples given hereinafter is within 600 seconds and is improved by at least 20% as compared with the value of the PTFE aqueous emulsion obtained by the emulsion polymerization under the same conditions except that the highly reactive comonomer is not incorporated.

If the improvement of the stabilization time is less than 20%, the effect to stabilize the PTFE aqueous emulsion is inadequate. Further, if the stabilization time exceeds 600 seconds, the stability is too much, whereby the time for the concentration by adding various stabilizing agents for aqueous emulsion to the PTFE aqueous emulsion or the coagulation/hydrophobization time till obtaining the PTFE fine powder tends to be long, such being disadvantageous from the viewpoint of the productivity.

In order to prolong the stability time of the PTFE aqueous emulsion, the amount of the highly reactive comonomer to be added may be increased within the range prescribed by the present invention. Further, in order to shorten it, the amount of the highly reactive comonomer to be added may be reduced within the range prescribed by the present invention.

The PTFE aqueous emulsion of the present invention may be used for various applications such as electronic materials such as printed boards, roof materials for film structure, surface coating agents for cookware, spun fibers of fluorinated polymer such as PTFE fibers, dust-preventing agents, binders for battery active materials, plastic additives, etc.

By adding a nonionic surfactant to the PTFE aqueous emulsion of the present invention for stabilization, followed by concentration, it is possible to obtain an aqueous dispersion of PTFE microparticles having the PTFE microparticles concentrated (hereinafter referred to also as a "PTFE aqueous dispersion"). The content of PTFE microparticles in the PTFE aqueous dispersion is preferably from 50 to 70 mass %, more preferably from 55 to 65 mass %. To the PTFE aqueous dispersion, various additives such as an antiseptic, a viscosity-adjusting agent, etc. may further be incorporated.

To the PTFE aqueous dispersion, as it is, or after diluted with water, a desired powdery filler is added, followed by intense mechanical stirring for coagulation, and the obtained coagulated material is useful for an application to e.g. an electrode material for batteries, a lubrication component, etc. Further, at the time of its use, a known component such as an organic solvent, a very small amount of a coagulant, a colorant or the like may be added. As an example of the powdery filler, for example, in an application to a lubricating component, an inorganic powder such as lead powder, zinc powder, glass powder, glass fiber powder, quartz powder or alumina powder, a carbonaceous powder such as graphite powder, coke powder or carbon fiber powder, a metal powder such as bronze powder, cupper powder or stainless steel powder, a heat resistant resin powder such as polyamide powder, polyimide powder, polyether ketone powder, polyether ether ketone powder or polyether sulfone powder, may, for example, be mentioned. Further, in an application to an electrode material for batteries, manganese dioxide powder, zinc powder, graphite powder, nickel oxyhydroxide powder, lithium manganate powder, lithium cobaltate powder, hydrogen storing alloy powder, may, for example, be mentioned.

The process for producing the PTFE fine powder is not particularly limited, and a conventional process may be used for the production. For example, a shearing force such as stirring is exerted to the PTFE aqueous emulsion of the present invention to coagulate dispersed primary particles of PTFE microparticles, and coagulum are separated from the aqueous medium, followed by agglomeration, particle size regulation and drying to obtain a PTFE fine powder. Here, the agglomeration means a process wherein secondary particles obtainable by coagulation of primary particles of PTFE which were dispersed at the time of coagulation of the PTFE aqueous emulsion, will grow to a particle size of a several hundred μm. Further, the particle size regulation is a process wherein the particle state and particle size distribution of the secondary particles are regulated by continuous stirring after the agglomeration.

Specifically, by the following process, a PTFE powder can be produced.

That is, the PTFE aqueous emulsion is diluted with water so that the PTFE concentration will be from 8 to 20 mass %, followed by exerting a shearing force by e.g. vigorous stirring to coagulate primary particles of PTFE. At the time of coagulating primary particles of PTFE, the pH of the PTFE aqueous emulsion may be adjusted, or a coagulation aid such as an electrolyte or a water-soluble organic solvent may be added to the PTFE aqueous emulsion, as the case requires. As the pH adjusting agent, sodium carbonate or sodium hydrogencarbonate may be mentioned. Further, the pH adjustment may be carried out in the presence of at least one compound selected from the group consisting of ammonia, an ammonium salt and urea. As the electrolyte, an inorganic salt such as potassium nitrate, sodium nitrate, sodium carbonate or sodium hydrogencarbonate may be mentioned. As the organic solvent, an alcohol or acetone may, for example, be mentioned.

Then, a PTFE fine powder having primary particles of PTFE coagulated, is separated from the aqueous medium, followed by agglomeration and particle size regulation to obtain a wet state PTFE fine powder. Here, in the aqueous medium after separating the PTFE fine powder, the fluorinated surfactant is contained, and the fluorinated surfactant contained in such an aqueous medium, can be recovered by means of a method for adsorption by an ion exchange resin, a concentration method such as evaporation of moisture, or adsorption on activated carbon.

Then, the separated wet state PTFE fine powder (hereinafter referred to as a non-dried PTFE fine powder) is dried.

The temperature for drying the non-dried PTFE fine powder is preferably from 110 to 250° C., more preferably from 120 to 230° C. If the drying temperature is lower than 110° C., it takes time for the drying, and there may be a case where the moisture cannot adequately be removed. If the drying temperature exceeds 250° C., the paste extrusion pressure properties may not be improved. Here, in a case where the non-dried PTFE fine powder contains the fluorinated surfactant as adsorbed thereon, by introducing the air discharged during the drying into an aqueous alkaline solution, it is possible to recover the fluorinated surfactant contained in the dry air.

The drying of the non-dried PTFE fine powder is preferably carried out in an atmosphere containing ammonia. Here, the atmosphere containing ammonia means an atmosphere wherein ammonia gas can be in contact with the non-dried PTFE fine powder. For example, it means an atmosphere containing ammonia gas, or an atmosphere wherein ammonia or a compound to generate ammonia is dissolved in the moisture contained in the non-dried PTFE fine powder, and ammonia gas is generated by e.g. heating. As the compound to generate ammonia, an ammonium salt or urea may, for example, be mentioned, and such a compound is decomposed by heating to generate ammonia gas. By carrying out the drying in an atmosphere containing ammonia, it is possible to lower the paste extrusion pressure of the fine powder without impairing the physical properties.

The PTFE fine powder of the present invention has a stress relaxation time of at least 500 seconds, preferably at least 525 seconds, more preferably at least 550 seconds. In the present invention, the stress relaxation time means a time required for breaking of a sample when a stretched bead prepared by using the PTFE fine powder is stretched under conditions of a clamp distance of 3.8 cm, a stretching rate of 1,000%/sec, and a total stretching of 2,400%, and such a stretched bead sample is left in an oven of 390° C. with its both ends fixed by fixtures. As disclosed, for example, in U.S. Pat. Nos. 5,470,655 and 4,576,869, the longer the stress relaxation time, the higher the heat resistance.

The PTFE fine powder of the present invention preferably has a SSG of from 2.135 to 2.175, more preferably from 2.135 to 2.165, particularly preferably from 2.135 to 2.155. SSG is used as an index for a relative molecular weight, and the lower the value, the higher the molecular weight generally. However, if the amount of the highly reactive comonomer introduced is large, the region of a non-crystalline structure further increases, whereby the density decreases and the value of SSG becomes small. The SSG value being too small means that the amount of the highly reactive comonomer introduced is large. In such a case, the average primary particle size of PTFE microparticles tends to be too small, and the stability of the PTFE aqueous emulsion tends to be excessively high. Further, the stress relaxation time becomes less than 500 seconds in many cases. This is considered to be attributable to an influence due to collapse of the crystal structure of PTFE. On the other hand, if the SSG value is too high, such means that the molecular weight is low, whereby various physical properties are deteriorated.

By subjecting the PTFE fine powder of the present invention to paste extrusion molding, it is possible to obtain a desired molded product.

A conventional method may be employed as a method for paste extrusion molding of the PTFE fine powder. For example, a method may be mentioned wherein the PTFE fine powder and a lubricant are mixed to impart flowability to the PTFE fine powder, followed by paste extrusion molding to obtain a desired shape. The mixing proportion of the lubricant may suitably be selected so as to let the PTFE fine powder have flowability. Such a proportion is usually preferably from 15 to 30 parts by mass, more preferably from 20 to 25 parts by mass, of the lubricant, per 100 parts by mass of the PTFE fine powder. As the lubricant, naphtha or a petroleum type hydrocarbon having a dry point of at least 100 is preferred. Further, it is also possible to add an additive such as a pigment for coloration or various fillers to impart strength, electrical conductivity, etc.

Various shapes such as a tube shape, a sheet shape, a film shape, a fiber shape, etc. may be employed as the shape of the paste extrusion molded product of the PTFE fine powder. As applications of the molded product, a tube, an electric wire covering, a sealing material, a porous membrane, a filter, etc. may be mentioned. Further, a stretched porous material of PTFE is obtainable by stretching after the paste extrusion of the PTFE fine powder. As the stretching conditions, a suitable rate, e.g. a rate of from 5%/sec to 1,000%/sec, and a suitable stretching ratio, e.g. a stretching ratio of 500%, may be employed. The porosity of the stretched porous material is not particularly limited, but the porosity is usually preferably within a range of from 50 to 99%, particularly preferably within a range of from 70 to 98%. Various shapes such as a tube shape, a sheet shape, a film shape, a fiber shape, etc. may be adopted as the shape of an article made of the stretched porous material.

EXAMPLES

Now, the present invention will be described in detail with reference to Examples and Comparative Examples, but it should be understood that the present invention is by no means thereby restricted.
[Measuring Methods]
(A) Average Primary Particle Size of PTFE Microparticles (Unit: μm)
Measured by means of a laser scattering type particle size distribution analyzer (trade name "LA-920" manufactured by HORIBA, Ltd.).
(B) Standard Specific Gravity (Hereinafter Referred to also as SSG) of PTFE Fine Powder
Measured in accordance with ASTM D1457-91a, D4895-91a. 12.0 g of a PTFE fine powder was weighed and held for two minutes under 34.5 MPa in a cylindrical mold having an inner diameter of 28.6 mm. This was put in an oven of 290° C. and heated at a rate of 120° C./hr. After being held at 380° C. for 30 minutes, it was cooled at a rate of 60° C./hr and held at 294° C. for 24 minutes. Then, it was held in a desiccator of 23° C. for 12 hours, and then, the mass in air and the mass in water of the molded product at 23° C. were measured to obtain its specific gravity ratio to water at 23° C., which was multiplied by the density value of water at 23° C. to obtain a value, which was taken as the standard specific gravity.
(C) Stability Time of PTFE Aqueous Emulsion
In a cylindrical container made of SUS304 and having an inner diameter of 12 cm, two baffle plates each having a thickness of 2.9 mm, a width of 2.5 cm and a length of 15 cm were used as symmetrically welded at a height of 2.5 cm from the bottom.
A PTFE aqueous emulsion prepared to have a solid content concentration of 20% was charged in a total amount of 800 g, and the temperature was adjusted to 23±1° C. And, a horizontal paddle having a thickness of 1.2 mm, a width of 1.3 mm and a length of 9.7 cm, attached to a shaft with an inner diameter of 8.0 mm, as inclined at 30° in the rotational direction, was installed at a height of 5 mm from the bottom, and operated under a condition of 500 rpm, whereby the time until the PTFE aqueous emulsion was destroyed to form hydrophobized PTFE, was taken as the stability time.
(D) Evaluation of Extrusion Pressure and Stretchability
100 g of a PTFE fine powder left to stand at room temperature for at least two hours, was put into a glass bottle having an internal capacity of 900 cc, and 21.7 g of a lubricant (trade name "Isopar H (registered trademark)", manufactured by Exxon) was added, followed by mixing for 3 minutes to obtain a PTFE fine powder mixture. The obtained PTFE fine powder mixture was left to stand for two hours in a 25° C. constant temperature tank and then subjected to paste extrusion through an orifice having a diameter of 2.5 cm, a land length of 1.1 cm and an introduction angle of 30° at 25° C. under conditions of a reduction ratio (a ratio of the cross-sectional area of the inlet to the cross-sectional area of the outlet of the die) of 100 and an extrusion rate of 51 cm/min, to obtain a bead. At that time, the pressure required for the paste extrusion of the PTFE fine powder mixture was measured and taken as the extrusion pressure.
Then, the obtained bead was dried at 230° C. for 30 minutes to remove the lubricant. And, the length of the bead was cut into a suitable length, and each end was fixed so that the clamp distance became either 3.8 cm or 5.1 cm, followed by heating at 300° C. in an air circulating furnace. Then, stretching was carried out at a prescribed speed until the clamps became a predetermined distance.

(E) Measurement of Breaking Strength

A sample for a breaking strength measuring test was prepared by stretching a bead in the same manner as in the evaluation for stretchability under conditions of a clamp distance of 5.1 cm, a stretching rate of 100%/sec and a total stretching of 2,400%. And, this sample was fixed as pinched by movable jaws having a gauge length of 5.0 cm, whereupon the movable jaws were driven at a speed of 300 mm/min, whereby the breaking strength was measured at room temperature by means of a tensile tester (manufactured by A&D Company, Limited), and the smallest tensile breaking load (force) among three samples obtainable from the stretched bead i.e. one from each end of the stretched bead, (if a neck down is observed in the clamped range, such is extruded) and one from its center, was taken as the breaking strength.

(F) Measurement of Stress Relaxation Time

A sample for measuring the stress relaxation time was prepared by stretching a bead in the same manner as in the evaluation of stretchability under conditions of a clamp distance of 3.8 cm, a stretching rate of 1,000%/sec, and a total stretching of 2,400%. This sample was fixed at its both ends by fixtures and spread to have an entire length of 25 cm. As the stress relaxation time, a time required for breaking when this sample was left in an oven at 390° C., was obtained.

Example 1

Into a 100 L stainless steel autoclave equipped with baffle plates and a stirrer, 70 g of $C_2F_5OC_2F_4OCF_2COONH_4$ (ammonium perfluoro-3,6-dioxaoctanoate, hereinafter referred to "APFDO"), 872 g of paraffin wax and 59 L of deionized water were charged. The autoclave was flushed with nitrogen and then depressurized, and 2 g of $CH_2=CH-(CF_2)_4F$ (hereinafter referred to as "PFBE") and 300 g of deionized water were charged together by suction. Then, the autoclave was pressurized with TFE, and the temperature was raised to 70° C. with stirring. Then, the pressure was raised to 1.765 MPa with TFE, and 5.0 g of disuccinic acid peroxide (concentration: 80 mass %, the rest being water) was injected as dissolved in 1 L of warm water of about 70° C. In 453 seconds, the inner pressure was dropped to 1.746 MPa. And, while adding TFE to have the autoclave inner pressure maintained at 1.765 MPa, the polymerization was proceeded. APFDO dissolved in warm water was added during the polymerization in a total amount of 125 g as APFDO. Further, ammonium sulfite as dissolved in water was added during the polymerization in a total amount of 4 g as ammonium sulfite. The temperature was lowered to 65° C. on the way and raised to 90° C. in the later stage of polymerization. When the amount of TFE added reached 23 kg, the reaction was terminated, and TFE in the autoclave was released to the atmospheric air. The polymerization time was 183 minutes.

The obtained PTFE aqueous emulsion was cooled, and the supernatant paraffin wax was removed. The solid content concentration of the PTFE aqueous emulsion was about 26 mass %. APFDO used was 8,478 ppm relative to the final amount of PTFE obtained. Further, the amount of PFBE added was 0.0087 mass % relative to the final amount of PTFE obtained. Further, coagulum in the reactor were at a level of a trace. And, the average primary particle size of the PTFE microparticles was 0.25 µm, and the stability time of the PTFE aqueous emulsion was 206 seconds.

This PTFE aqueous emulsion was diluted to a concentration of 10 mass % with pure water and adjusted to 20° C., followed by stirring for coagulation to produce a PTFE fine powder. Then, this PTFE fine powder was dried at 180° C. SSG was 2.142. Further, in accordance with the measuring method (D), a paste extrusion bead was obtained. The extrusion pressure was 17.8 MPa. This stretched bead was a uniform porous material free from fracture or formation of voids, and the breaking strength was 25.9 N. The stress relaxation time was 516 seconds.

Comparative Example 1

A PTFE aqueous emulsion was produced by carrying out a polymerization reaction in the same manner as in Example 1 except that no PFBE was added in Example 1. The time for dropping the inner pressure to 1.746 MPa prior to the initiation of polymerization was 152 seconds. In Comparative Example 1, a comonomer (PFBE) was not incorporated during the emulsion polymerization of TFE, whereby the time for dropping the inner pressure was at a level of 30% in Example 1. Further, the polymerization time was 200 minutes. Further, the average primary particle size of PTFE microparticles in the obtained PTFE aqueous emulsion was 0.28 µm, and the stability time of the PTFE aqueous emulsion was 168 seconds. The stability time in Comparative Example 1 was as short as about 80% in Example 1.

Further, by using this PTFE aqueous emulsion, a PTFE fine powder was produced in the same manner as in Example 1. SSG of this PTFE fine powder was 2.151. Further, in the same manner as in Example 1, a paste extrusion bead was obtained. The extrusion pressure was 17.0 MPa. This stretched bead was a uniform porous material free from fracture or formation of voids, and the breaking strength was 22.1 N. The stress relaxation time was 549 seconds.

Comparative Example 2

A PTFE aqueous emulsion was produced by carrying out a polymerization reaction in the same manner as in Example 1 except that 3 g of PFBE was used in Example 1. The time for dropping the inner pressure to 1.746 MPa prior to the initiation of polymerization was 1,003 seconds. The polymerization time was 182 minutes. Further, the content of PFBE was 0.013 mass % relative to the final amount of PTFE obtained. Further, the average primary particle size of PTFE microparticles in the obtained PTFE aqueous emulsion was 0.21 µm, and the stability time of the PTFE aqueous emulsion was 366 seconds.

By using this PTFE aqueous emulsion, a PTFE fine powder was produced in the same manner as in Example 1. SSG of this PTFE fine powder was 2.139. Further, in the same manner as in Example 1, a paste extrusion bead was obtained. The extrusion pressure was 18.6 MPa. This stretched bead was a uniform porous material free from fracture or formation of voids, and the breaking strength was 27.0 N. The stress relaxation time was 454 seconds. The stress relaxation time was short as compared with Example 1, and the heat resistance was poor.

Example 2

A PTFE aqueous emulsion was produced by carrying out a polymerization reaction in the same manner as in Example 1 except that 2 g of $CF_2=CF-O-(CF_2)_2CF=CF_2$ (hereinafter referred to as "BVE") (reactivity ratio $r_{TFE}$=5.7) was used instead of PFBE in Example 1. The time for dropping the inner pressure to 1.746 MPa prior to the initiation of polymerization was 147 seconds. The polymerization time was 225 minutes. Further, the amount of BVE added was 0.0087 mass % relative to the final amount of PTFE obtained. Further, the average primary particle size of PTFE microparticles in the obtained PTFE aqueous emulsion was 0.25 μm, and the stability time of the PTFE aqueous emulsion was 238 seconds. The stability time was improved by 42% as compared with Comparative Example 1.

Using this PTFE aqueous emulsion, in the same manner as in Example 1, a PTFE fine powder was produced. SSG of this PTFE fine powder was 2.152. Further, in the same manner as in Example 1, a paste extrusion bead was obtained. The extrusion pressure was 16.2 MPa. This stretched bead was a uniform porous material free from fracture or formation of voids, and the breaking strength was 22.2 N. The stress relaxation time was 517 seconds.

Comparative Example 3

A PTFE aqueous emulsion was produced by carrying out a polymerization reaction in the same manner as in Example 1 except that 2 g of $CF_2=CF-O-C_3F_7$ (hereinafter referred to as "PPVE") (reactivity ratio $r_{TFE}=8.72$) was used instead of PFBE in Example 1. The time for dropping the inner pressure to 1.746 MPa prior to the initiation of polymerization was 186 seconds. In Comparative Example 3, the polymerization rate was deactivated, and the polymerization was terminated in a polymerization time of 278 minutes and in an amount of TFE of 18 kg added, whereby no adequate amount was obtained. Further, the amount of PPVE added was 0.011 mass % relative to the final amount of PTFE obtained. Further, the average primary particle size of PTFE microparticles in the obtained PTFE aqueous emulsion was 0.23 μm, and the stability time of the PTFE aqueous emulsion was 271 seconds.

Using this PTFE aqueous emulsion, in the same manner as in Example 1, a PTFE fine powder was produced. SSG of this PTFE fine powder was 2.152. Further, in the same manner as in Example 1, a paste extrusion bead was obtained. The extrusion pressure was 17.6 MPa. This stretched bead had many voids formed and was hardly regarded as a uniform porous material, and the breaking strength was 4.6 N. The stress relaxation time was 266 seconds.

Example 3

A PTFE aqueous emulsion was produced by carrying out a polymerization reaction in the same manner as in Example 1 except that 1.3 g of perfluoro(2-methylene-4-methyl-1,3-dioxolane) (hereinafter referred to as "MMD") (reactivity ratio $r_{TFE}=0.4$) was used instead of PFBE in Example 1. The time for dropping the inner pressure to 1.746 MPa prior to the initiation of polymerization was 134 seconds. The polymerization time was 177 minutes. Further, the content of MMD was 0.0057 mass % relative to the final amount of PTFE obtained. Further, the average primary particle size of PTFE microparticles in the obtained PTFE aqueous emulsion was 0.25 μm, and the stability time of the PTFE aqueous emulsion was 228 seconds. The stability of the aqueous emulsion was improved by 36% as compared with Comparative Example 1.

By using this PTFE aqueous emulsion, in the same manner as in Example 1, a PTFE fine powder was produced. SSG of this PTFE fine powder was 2.145. Further, in the same manner as in Example 1, a paste extrusion bead was obtained. The extrusion pressure was 17.5 MPa. This stretched bead was a uniform porous material free from fracture or formation of voids, and the breaking strength was 24.4 N. The stress relaxation time was 508 seconds.

Example 4

Into the autoclave as used in Example 1, 50 g of APFDO, 862 g of paraffin wax, 6.5 g of succinic acid, 0.3 g of oxalic acid and 61 L of deionized water were charged. The autoclave was flushed with nitrogen and then depressurized, and 0.5 g of PFBE and 300 g of deionized water were charged together by suction. Then, the autoclave was pressurized with TFE, and the temperature was raised to 65° C. with stirring. Then, the pressure was raised to 1.275 MPa with TFE, and 0.04% of potassium permanganate aqueous solution was added at a rate of from 3.5 ml to 4 ml/min. After adding 7.5 kg of TFE, the addition of the potassium permanganate aqueous solution was stopped, and APFDO was additionally added. The inner temperature was raised to 90° C. Then, TFE was added up to 22 kg, and the reaction was terminated, and TFE in the autoclave was released to the atmospheric air. The polymerization time was 216 minutes.

The obtained PTFE aqueous emulsion was cooled, and the supernatant paraffin wax was removed. The solid content concentration of the PTFE aqueous emulsion was about 26 mass %. Further, the content of PFBE was 0.0023 mass % relative to the final amount of PTFE obtained. Further, coagulum in the reactor were at a level of a trace. And, the average primary particle size of the PTFE microparticles was 0.23 μm, and the stability time of the PTFE aqueous emulsion was 267 seconds.

This PTFE aqueous emulsion was diluted to a concentration of 10 mass % with pure water and adjusted to 20° C., followed by stirring for coagulation. And, an aqueous ammonium carbonate solution (concentration of 20 mass %) was preliminarily charged to a dry tray in an amount of 10 mass % relative to PTFE microparticles (dry weight), and then, a prescribed amount was put, followed by drying at 135° C. to produce a PTFE fine powder. SSG of this PTFE fine powder was 2.142. Further, in accordance with the measuring method (D), a paste extrusion bead was obtained. The extrusion pressure was 17.2 MPa. This stretched bead was a uniform porous material free from fracture or formation of voids, and the breaking strength was 29.6 N. The stress relaxation time was 538 seconds.

Comparative Example 4

A PTFE aqueous emulsion was produced by carrying out a polymerization reaction in the same manner as in Example 4 except that PFBE was not used in Example 4. The polymerization time was 192 minutes. Further, the average primary particle size of PTFE microparticles in the obtained PTFE aqueous emulsion was 0.27 μm, and the stability time of the PTFE aqueous emulsion was 176 seconds. The stability of the aqueous emulsion was a short time at a level of about 70% of Example 4.

Using this PTFE aqueous emulsion, in the same manner as in Example 4, coagulation was carried out to produce a PTFE fine powder. SSG of this PTFE fine powder was 2.147. Further, in the same manner as in Example 4, a paste extrusion bead was obtained. The extrusion pressure was 17.2 MPa. This stretched bead was a uniform porous material free from fracture or formation of voids, and the breaking strength was 28.3 N. The stress relaxation time was 488 seconds. The stress relaxation time was short as compared with Example 4, and the heat resistance was poor.

Comparative Example 5

A PTFE aqueous emulsion was produced by carrying out a polymerization reaction in the same manner as in Example 4 except that 2.5 g of PFBE was used in Example 4. The polymerization time was 192 minutes. Further, the content of PFBE was 0.011 mass % relative to the final amount of PTFE obtained. Further, the average primary particle size of PTFE microparticles in the obtained PTFE aqueous emulsion was 0.19 μm, and the stability time of the PTFE aqueous emulsion was 810 seconds.

By using this PTFE aqueous emulsion, in the same manner as in Example 4, coagulation was carried out to produce a PTFE fine powder. SSG of this PTFE fine powder was 2.139. Further, in the same manner as in Example 4, a paste extrusion bead was obtained. The extrusion pressure was 18.8 MPa. This stretched bead was a uniform porous material free from fracture or formation of voids, and the breaking strength was 33.4 N. The stress relaxation time was 475 seconds. The stress relaxation time was short as compared with Example 4, and the heat resistance was poor.

Example 5

A PTFE aqueous emulsion was produced by carrying out a reaction in the same manner as in Example 4 except that 1 g of $CH_2=CH-(CF_2)_6F$ (hereinafter referred to as "PFHE") was used instead of PFBE in Example 4. The polymerization time was 232 minutes. Further, the content of PFHE was 0.0045 mass % relative to the final amount of PTFE obtained. Further, the average primary particle size of PTFE microparticles in the obtained PTFE aqueous emulsion was 0.25 μm, and the stability time of the PTFE aqueous emulsion was 285 seconds. The stability time was improved by 62% as compared with Comparative Example 4.

By using this PTFE aqueous emulsion, in the same manner as in Example 4, coagulation was carried out to obtain a PTFE fine powder. SSG of this PTFE fine powder was 2.142. Further, in the same manner as in Example 4, a paste extrusion bead was obtained. The extrusion pressure was 16.3 MPa. This stretched bead was a uniform porous material free from fracture or formation of voids, and the breaking strength was 28.2 N. The stress relaxation time was 569 seconds.

Example 6

A PTFE aqueous emulsion was produced by carrying out a reaction in the same manner as in Example 4 except that 2 g of PFHE was used instead of PFBE in Example 4. The polymerization time was 190 minutes. Further, the content of PFHE was 0.0091 mass % relative to the final amount of PTFE obtained. Further, the average primary particle size of PTFE microparticles in the obtained PTFE aqueous emulsion was 0.23 μm, and the stability time of the PTFE aqueous emulsion was 392 seconds. The stability time was improved by 123% as compared with Comparative Example 4.

Using this PTFE aqueous emulsion, in the same manner as in Example 4, coagulation was carried out to produce a PTFE fine powder. SSG of this PTFE fine powder was 2.139. Further, in the same manner as in Example 4, a paste extrusion bead was obtained. The extrusion pressure was 16.2 MPa. This stretched bead was a uniform porous material free from fracture or formation of voids, and the breaking strength was 28.6 N. The stress relaxation time was 519 seconds.

Example 7

A PTFE aqueous emulsion was produced by carrying out a reaction in the same manner as in Example 4 except that 0.8 g of MMD was used instead of PFBE in Example 4. The polymerization time was 198 minutes. Further, the content of MMD was 0.0045 mass % relative to the final amount of PTFE obtained. Further, the average primary particle size of PTFE microparticles in the obtained PTFE aqueous emulsion was 0.24 μm, and the stability time of the PTFE aqueous emulsion was 347 seconds. The stability time was improved by 97% as compared with Comparative Example 4.

By using this PTFE aqueous emulsion, in the same manner as in Example 4, coagulation was carried out to produce a PTFE fine powder. SSG of this PTFE fine powder was 2.141. Further, in the same manner as in Example 4, a paste extrusion bead was obtained. The extrusion pressure was 17.3 MPa. This stretched bead was a uniform porous material free from fracture or formation of voids, and the breaking strength was 29.8 N. The stress relaxation time was 594 seconds.

Example 8

A PTFE aqueous emulsion was produced by carrying out a reaction in the same manner as in Example 4 except that 2 g of MMD was used instead of PFBE in Example 4. The polymerization time was 159 minutes. Further, the content of MMD was 0.0091 mass % relative to the final amount of PTFE obtained. Further, the average primary particle size of PTFE microparticles in the obtained PTFE aqueous emulsion was 0.22 μm, and the stability time of the PTFE aqueous emulsion was 532 seconds. The stability time was improved by 202% as compared with Comparative Example 4.

By using this PTFE aqueous emulsion, in the same manner as in Example 4, coagulation was carried out to produce a PTFE fine powder. SSG of this PTFE fine powder was 2.137. Further, in the same manner as in Example 4, a paste extrusion bead was obtained. The extrusion pressure was 17.4 MPa. This stretched bead was a uniform porous material free from fracture or formation of voids, and the breaking strength was 29.4 N. The stress relaxation time was 509 seconds.

The above results are summarized in Tables 1 and 2.

TABLE 1

|  | Ex. 1 | Comp. Ex. 1 | Comp. Ex. 2 | Ex. 2 | Comp. Ex. 3 | Ex. 3 |
|---|---|---|---|---|---|---|
| Type of comonomer | PFBE | PFBE | PFBE | BVE | PPVE | MMD |
| Charged amount of comonomer (mass %/PTFE) | 0.0087 | 0 | 0.013 | 0.0087 | 0.011 | 0.0057 |
| Primary particle size of PTFE microparticles (μm) | 0.25 | 0.28 | 0.21 | 0.25 | 0.23 | 0.25 |
| Stability time (seconds) | 206 | 168 | 366 | 238 | 271 | 228 |
| SSG | 2.142 | 2.151 | 2.139 | 2.152 | 2.152 | 2.145 |

TABLE 1-continued

|  | Ex. 1 | Comp. Ex. 1 | Comp. Ex. 2 | Ex. 2 | Comp. Ex. 3 | Ex. 3 |
|---|---|---|---|---|---|---|
| Extrusion pressure (MPa) | 17.8 | 17.0 | 18.6 | 16.2 | 17.6 | 17.5 |
| Breaking strength (N) | 25.9 | 22.1 | 27.0 | 22.2 | 4.6 | 24.4 |
| Stress relaxation time (seconds) | 516 | 549 | 454 | 517 | 266 | 508 |

TABLE 2

|  | Ex. 4 | Comp. Ex. 4 | Comp. Ex. 5 | Ex. 5 | Ex. 6 | Ex. 7 | Ex. 8 |
|---|---|---|---|---|---|---|---|
| Type of comonomer | PFBE | PFBE | PFBE | PFHE | PFHE | MMD | MMD |
| Charged amount of comonomer (mass %/PTFE) | 0.0023 | 0 | 0.011 | 0.0045 | 0.0091 | 0.0036 | 0.0091 |
| Primary particle size of PTFE microparticles (μm) | 0.23 | 0.27 | 0.19 | 0.25 | 0.23 | 0.24 | 0.22 |
| Stability time (seconds) | 267 | 176 | 810 | 285 | 392 | 347 | 532 |
| SSG | 2.142 | 2.147 | 2.139 | 2.142 | 2.139 | 2.141 | 2.137 |
| Extrusion pressure (MPa) | 17.2 | 17.2 | 18.8 | 16.3 | 16.2 | 17.3 | 17.4 |
| Breaking strength (N) | 29.6 | 28.3 | 33.4 | 28.2 | 28.6 | 29.8 | 29.4 |
| Stress relaxation time (seconds) | 538 | 488 | 475 | 569 | 519 | 594 | 509 |

INDUSTRIAL APPLICABILITY

The PTFE fine powder and the stretched porous material of the present invention are useful for applications to e.g. various tubes, wire coatings, sealing materials, porous membranes, filters, etc.

Further, the PTFE aqueous dispersion of the present invention is useful for various applications to e.g. electronic materials such as printed boards, roof materials for film structures, surface coating agents for cookware, fluorinated polymer fibers such as spun PTFE fibers, dust-preventing agents, binders for battery active substances, plastic additives, etc.

This application is a continuation of PCT Application No. PCT/JP2010/069863, filed Nov. 8, 2010, which is based upon and claims the benefit of priority from Japanese Patent Application No. 2009-255949 filed on Nov. 9, 2009. The contents of those applications are incorporated herein by reference in its entirety.

What is claimed is:

1. A process for producing a polytetrafluoroethylene aqueous emulsion, the process comprising:
    charging to a polymerization reactor a full amount of at least one comonomer selected from the group consisting of $CH_2=CH-(CF_2)_4F$, $CH_2=CH-(CF_2)_6F$ and perfluoro(2-methylene-4-methyl-1,3-dioxolane);
    adding to the reactor at least one fluorinated emulsifier selected from the group consisting of a $C_{4-8}$ fluorinated carboxylic acid having from 1 to 4 etheric oxygen atoms in a main chain and salts thereof;
    initiating an emulsion polymerization reaction of tetrafluoroethylene in the presence of the at least one fluorinated emulsifier and the full amount of the at least one comonomer; and
    continuing the emulsion polymerization of tetrafluoroethylene to obtain an aqueous emulsion containing polytetrafluoroethylene microparticles having an average primary particle size of from 0.21 to 0.27 μm;
    wherein
    a stability time of an aqueous 20% solid content emulsion of the polytetrafluoroethylene microparticles at 23° C. is greater than 200 seconds,
    a content of the at least one comonomer in the polytetrafluoroethylene produced is from 0.0015 to 0.01 mass % relative to the final amount of polytetrafluoroethylene produced, and
    a stress relaxation time of the polytetrafluoroethylene produced is at least 500 seconds.

2. The process for producing a polytetrafluoroethylene aqueous emulsion according to claim 1, wherein the average primary particle size of the polytetrafluoroethylene microparticles is from 0.22 to 0.27 μm.

3. The process for producing a polytetrafluoroethylene aqueous emulsion according to claim 1, wherein the at least one comonomer is at least one of, $CH_2=CH-(CF_2)_4F$ and $CH_2=CH-(CF_2)_6F$.

4. The process for producing a polytetrafluoroethylene aqueous emulsion according to claim 1, wherein the at least one comonomer is perfluoro(2-methylene-4-methyl-1,3-dioxolane).

5. A polytetrafluoroethylene aqueous emulsion obtained by the process as defined in claim 1.

6. A polytetrafluoroethylene aqueous dispersion obtained by a process comprising:
    stabilizing the emulsion of claim 5 by adding a nonionic surfactant; and concentrating the content of polytetrafluoroethylene microparticles to from 50 to 70 mass %.

7. A polytetrafluoroethylene fine powder obtained by a process comprising:
    coagulating the polytetrafluoroethylene aqueous emulsion as defined in claim 5, wherein a stress relaxation time of the polytetrafluoroethylene fine powder is at least 500 seconds.

8. The polytetrafluoroethylene fine powder according to claim 7, wherein a standard specific gravity of the polytetrafluoroethylene fine powder is from 2.135 to 2.155.

9. A stretched porous material obtained by a process comprising:
    paste extrusion of the polytetrafluoroethylene fine powder as defined in claim 7, followed by stretching the extrudate.

* * * * *